(12) United States Patent
Arimilli et al.

(10) Patent No.: US 8,601,241 B2
(45) Date of Patent: *Dec. 3, 2013

(54) GENERAL PURPOSE REGISTER CLONING

(75) Inventors: Ravi K. Arimilli, Austin, TX (US); Juan C. Rubio, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1386 days.

This patent is subject to a terminal disclaimer.

(21) Appl. No.: 12/024,198

(22) Filed: Feb. 1, 2008

(65) Prior Publication Data

US 2010/0293359 A1 Nov. 18, 2010

(51) Int. Cl.
*G06F 9/30* (2006.01)

(52) U.S. Cl.
USPC ........................................... 712/220

(58) Field of Classification Search
USPC ........................................... 712/220
See application file for complete search history.

(56) References Cited

U.S. PATENT DOCUMENTS

| | | | | |
|---|---|---|---|---|
| 5,933,627 | A * | 8/1999 | Parady | 712/228 |
| 2003/0233394 | A1 | 12/2003 | Rudd et al. | |
| 2004/0054990 | A1 | 3/2004 | Liao et al. | |
| 2004/0154011 | A1 | 8/2004 | Wang et al. | |
| 2004/0216102 | A1 | 10/2004 | Floyd | |
| 2005/0071841 | A1 | 3/2005 | Hoflehner et al. | |
| 2005/0223199 | A1 * | 10/2005 | Grochowski et al. | 712/235 |
| 2005/0278487 | A1 | 12/2005 | Blandy | |
| 2006/0155963 | A1 | 7/2006 | Bohrer et al. | |
| 2007/0022422 | A1 | 1/2007 | Tirumalai et al. | |
| 2007/0088915 | A1 | 4/2007 | Archambault et al. | |
| 2007/0226465 | A1 | 9/2007 | Chaudhry et al. | |

OTHER PUBLICATIONS

Aamodt, T. et al., "A Framework for Modeling and Optimization of Prescient Instruction Prefetch," SIGMETRICS'03, Jun. 10-14, 2003, San Diego, California, USA, pp. 13-24.
Wang, P. et al, "Helper Threads via Virtual Multithreading on an Experimental Itanium 2 Processor-Based Platform," ASPLOS'04, Oct. 9-13, 2004, Boston, Massachusetts, USA, pp. 144-155.
Aamodt, T. et al, "Optimization of Data Prefetch Helper Threads With Path-Expression Based Statistical Modeling," ICS'07, Jun. 18-20, 2007, Seattle, Washington, USA, pp. 210-221.
Shayetesh, A. et al, "Improving the Performance and Power Efficiency of Shared Helpers in CMPS," Cases'06, Oct. 23-25, 2006, Seoul, Korea, pp. 345-356.

(Continued)

*Primary Examiner* — Robert Fennema
(74) *Attorney, Agent, or Firm* — Yudell Isidore Ng Russell PLLC (57) ABSTRACT

A clone set of General Purpose Registers (GPRs) is created to be used by a set of helper thread binaries, which is created from a set of main thread binaries. When the set of main thread binaries enters a wait state, the set of helper thread binaries uses the clone set of GPRs to continue using unused execution units within a processor core. The set of helper threads are thus able to warm up local cache memory with data that will be needed when execution of the set of main thread binaries resumes.

20 Claims, 6 Drawing Sheets

(56) References Cited

OTHER PUBLICATIONS

Lu, J. et al, "Dynamic Helper Threaded Prefetching on the Sun Ultrasparc CMP Processor," Proceedings of the 38th Annual IEEE/ACM International Symposium on Microarchitecture (Micro'05), 2005, pp. 1-12.

Ku, W. et al, "Collaborative Multithreading: An Open Scalable Processor Architecture for Embedded Multimedia Applcations," ICME 2006, pp. 25-28.

Kim, D. et al, "Design and Evaluation of Compiler Algorithms for Pre-Execution," ASPLOS X, Oct. 2002, San Jose, California, USA, pp. 159-170.

Choi, S. et al, "A General Framework for Prefetch Scheduling in Linked Data Structures and Its Application to Multi-Chain Prefetching," ACM Transactions on Computer Systems, vol. 22, No. 2, May 2004, pp. 214-280.

Kim, D. et al, "A Study of Source-Level Compiler Algorithms for Automatic Construction of Pre-Execution Code," ACM Transactions on Computer Systems, vol. 22, No. 3, Aug. 2004, pp. 326-379.

Galvin, et al., "Operating System Concepts," Addison-Wesley Publishing Company, 4th Ed. 1995, pp. 111-116.

Arimilli et al., "Thread Partitioning in a Multi-Core Environment," U.S. Appl. No. 12/024,211, Office Action dated Mar. 22, 2011.

\* cited by examiner

GENERAL PURPOSE REGISTER CLONING

This invention was made with United States Government support under Agreement No. HR0011-07-9-0002 awarded by DARPA. The Government has certain rights in the invention.

BACKGROUND OF THE INVENTION

1. Technical Field

The present invention relates in general to computers, and in particular to processor cores. Still more particularly, the present invention relates to a system, method and computer program product for improving processor core performance.

2. Description of the Related Art

A computer can be viewed, in a simple perspective, as a set of hardware that manipulates data by executing instructions from an application, all under the control of an operating system. The application is a collection of all software needed to perform a task from a user's point of view. This includes the main thread(s) of executable binaries derived from the main thread. The executable binaries are groups of instructions that are loaded into execution units and other logic in a processor core in the computer.

When a user decides to run an application, the operating system loads the executable binaries into a region of memory, called the "code space." An instruction fetch unit then starts executing code, from the code space, to manipulate data from local registers and/or data caches. To optimize execution efficiency, the data to be manipulated needs to be readily available in the processor core.

SUMMARY OF THE INVENTION

A clone set of General Purpose Registers (GPRs) is created to be used by a set of helper thread binaries, which is created from a set of main thread binaries. When the set of main thread binaries enters a wait state, the set of helper thread binaries uses the clone set of GPRs to continue using unused execution units within a processor core. The set of helper threads are thus able to warm up local cache memory with data that will be needed when execution of the set of main thread binaries resumes.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
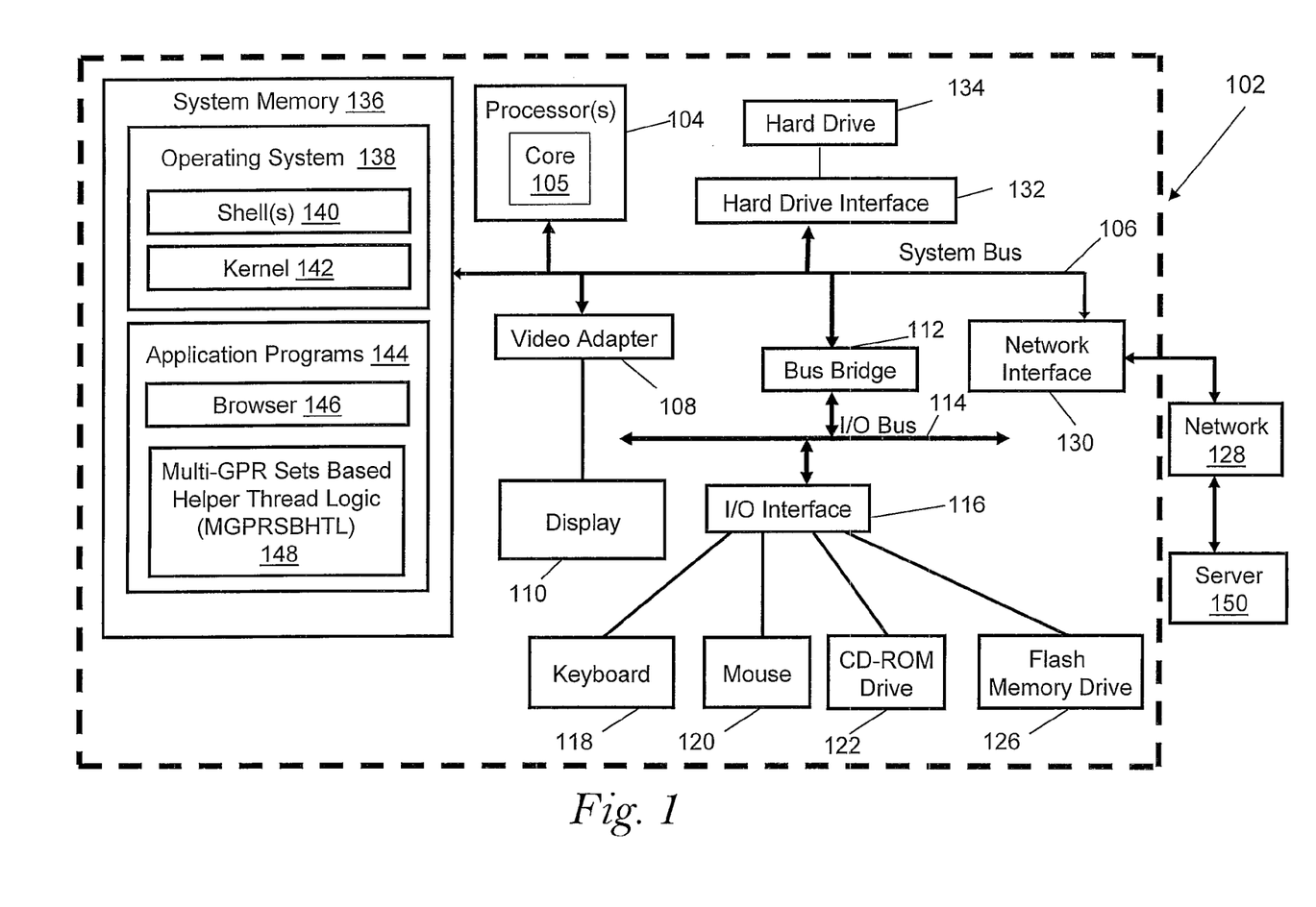
FIG. 1 is a block diagram of a data processing system in which the present invention may be implemented.

With reference now to FIG. 1, there is depicted a block diagram of an exemplary computer 102 in which the present invention may be implemented. Computer 102 includes one or more processors 104 that are coupled to a system bus 106. Within each of the processors 104 is a processor core 105, which includes fundamental memory and logic for executing computer instructions under the direct control of an operating system.

A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which provides lower levels of functionality to the OS 138 and application programs 144, including memory management, process and task management, disk management, network management, power management and mouse and keyboard management.

Application programs 144 include a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150.

Application programs 144 in computer 102's system memory (as well as in software deploying server 150's system memory) also include a Multi-GPR Sets Based Helper Thread Logic (MGPRSBHTL) 148. MGPRSBHTL 148 includes code for implementing the processes described in FIGS. 4 and 6. In one embodiment, computer 102 is able to download MGPRSBHTL 148 from software deploying server 150, including in an "on demand" basis, as described in greater detail below in FIGS. 4 and 6.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
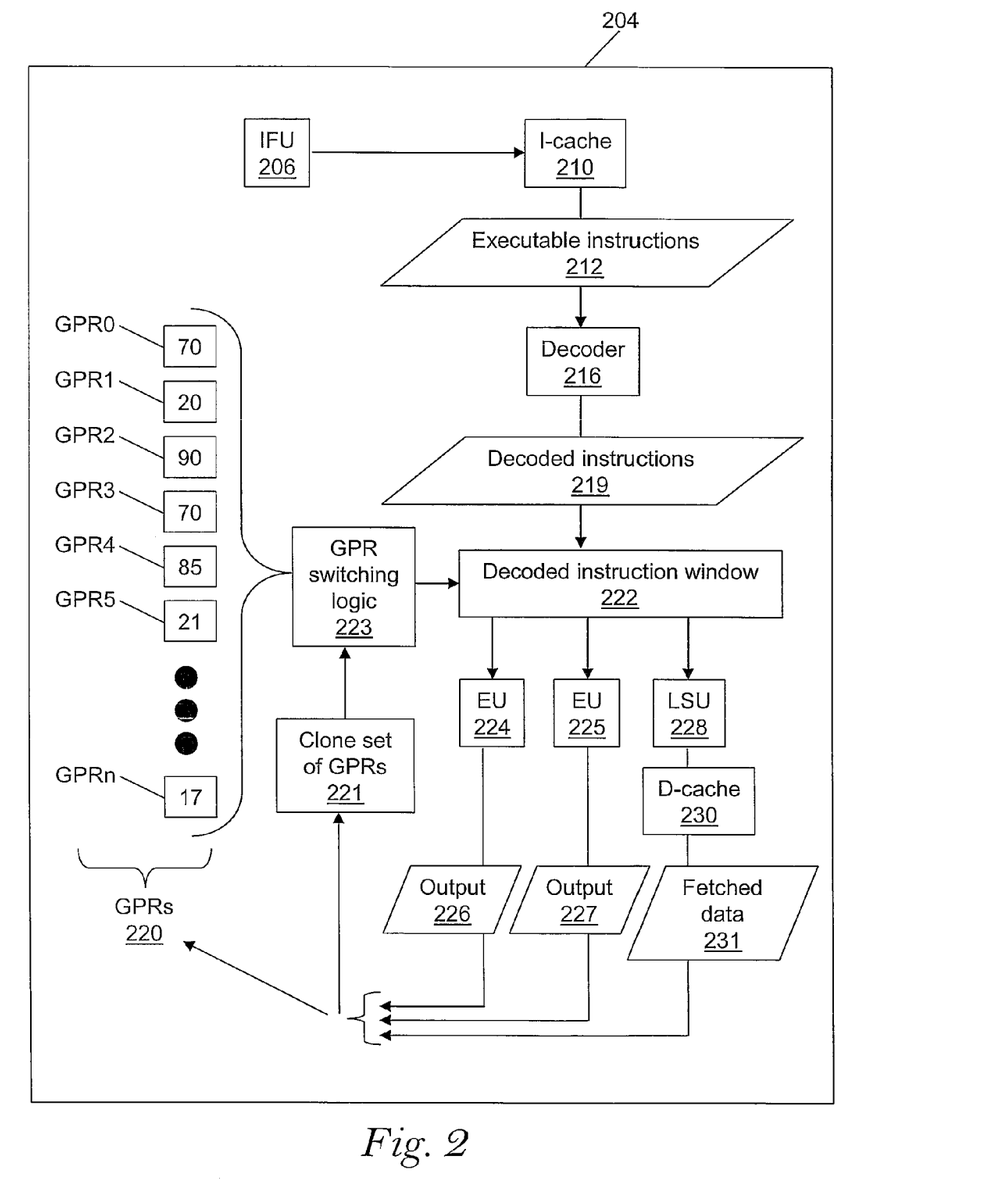
FIG. 2 depicts additional detail of a processor core used by the data processing system shown in FIG. 1.

With reference now to FIG. 2, additional detail of a processor core 204 (an example of one of the 105 depicted in FIG. 1) is presented. Note that processor core 204 has other features and components beyond those depicted in FIG. 2. While such other features and components are known to those skilled in the art of computer architecture design, depicting these other features and components is not necessary to understand the operation of the present invention, and thus such features and components are omitted for the sake of clarity.

Processor core 204 includes an Instruction Fetch Unit (IFU) 206, which fetches a next instruction from an instruction cache (I-cache) 210. It is to be understood that an instruction is code that, after being decoded in a manner such as that described below, is executable by an execution unit in a core. That is, source code is compiled to create object code, and object code is linked by a linker to create binaries, and binaries are used by a decoder to control the operation of an execution unit within the processor core 204. If I-cache 210 does not contain the requisite instructions, then those needed instructions are retrieved from lower levels of cache and/or system memory.

Thus, I-cache 210 sends instructions 212, which have been identified by the IFU 206 to an instruction decoder 216. The instruction decoder 216 determines what actions need to occur during the execution of the instructions 212, as well as which General Purpose Register (GPR) holds needed data. The GPRs, depicted as GPR0 through GPRn, where "n" is an integer (e.g., n=31). In the example shown, GPR0 contains the data "70" while GPR1 contains the value "20", etc. The processor core 204 includes two sets of GPRs, a main set of GPRs 220 and a clone set of GPRs 221. Processor core 204 also includes a GPR switching logic 223, which is discussed in more detail below in FIG. 5. The purpose and implementation of the main set of GPRs 220 and the clone set of GPRs 221 are also described in detail below.

The decoded instructions 219 and data from the GPRs 220 are buffered in a decoded instruction window 222, while they await previous operations to complete and results to become available. Once the inputs for the instruction in the decoded instruction window 222 become available they are sent to an Execution Unit (EU) 224. EU 224 may be a Fixed Point Execution Unit (FXU), a Floating Point Execution Unit (FPU), a Branch Execution Unit (BXU), or any other similar type of execution unit found in a processor core.

After executing the decoded instruction 222, the EU 224 sends the resultant output 226 into a particular GPR in the GPR's 220 and/or 221. The value of a GPR can also be sent to a Load/Store Unit (LSU) 228, which stores the value into a data cache (D-cache) 230. D-cache 230 stores fetched data 231 and provides fetched data 231 to GPRs 220 and/or 221.

In one embodiment, processor core 204 has multiple execution units, including EU 224 and EU 225. While the main thread binaries and helper thread binaries described herein may utilize a common IFU 206, Decoder 216, GPR's 220 and 221, LSU 228, and/or D-cache 230, the output 226 from EU 224 may be from execution of the main thread binaries, while the output 227 from EU 225 may be from execution of the helper thread binaries.

Figure 3:
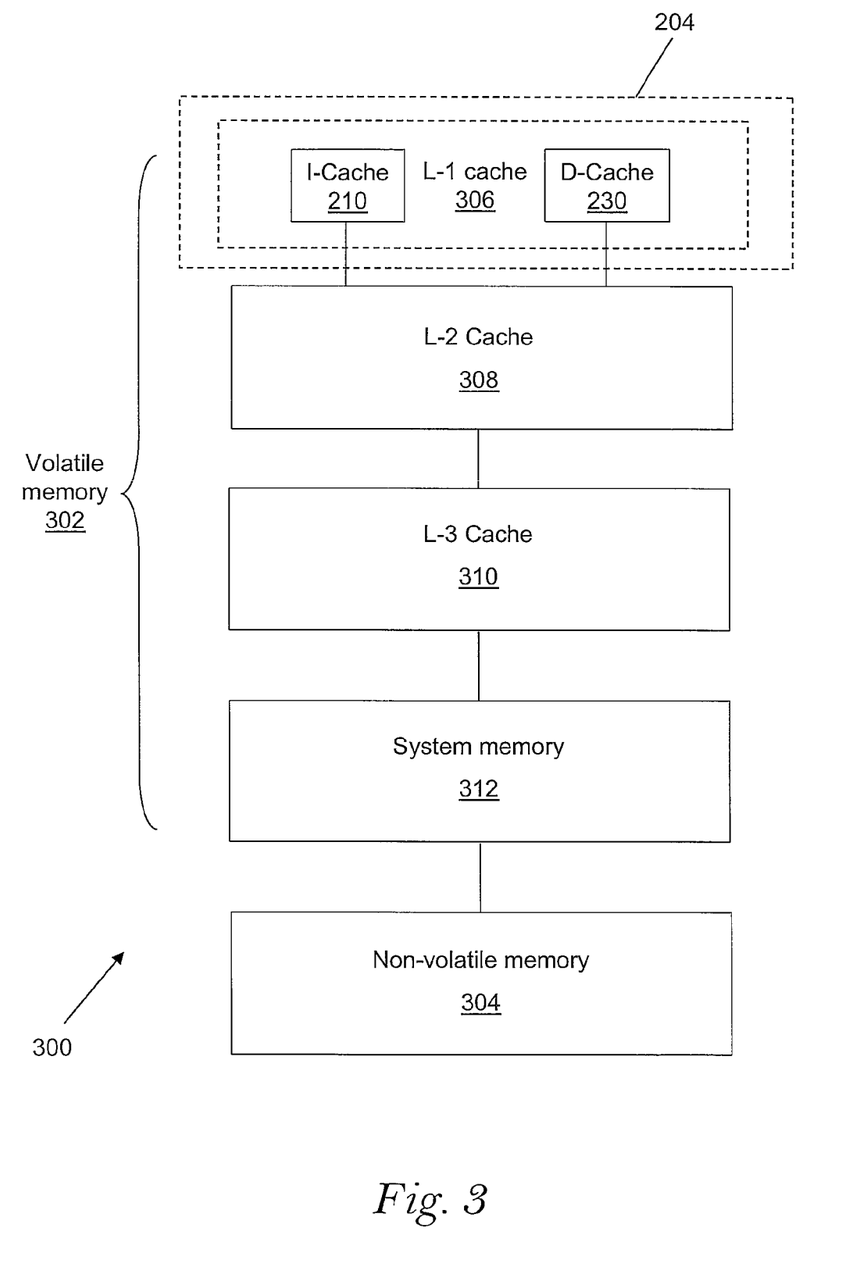
FIG. 3 illustrates a memory hierarchy used in the present invention.

With reference now to FIG. 3, a memory hierarchy 300 as utilized by the present invention is illustrated. Memory hierarchy 300 includes volatile memory 302 (memory that loses data when power is turned off) and non-volatile memory 304 (memory that is stored on a permanent medium that retains the data even after power is turned off). Within processor core 204 are level-one (L-1) cache 306, which includes I-cache 210 and D-cache 230 depicted in FIG. 2. In one embodiment, level-two (L-2) cache 308 and level-three (L-3) cache 310, as well as system memory 312 and non-volatile memory 304, are outside of processor core 204. In another embodiment, however, L-2 cache 308 and L-3 cache 310 are part of processor core 204. While the highest level of cache (L-1 cache 306) is the "fastest" (requiring only one or two clock cycles to retrieve data), L-1 cache 306 is also the smallest. Thus, if data is not within the L-1 cache 306, then that data must be pulled from the L-2 cache 308 (which is larger than the L-1 cache 306, but requires an order of magnitude more clock cycles to retrieve the needed data). Similarly, the L-3 cache 310 is yet larger and slower than the L-2 cache 308, the system memory 312 (e.g., Dynamic Random Access Memory—DRAM) is larger and slower than the L-3 cache 310, and the non-volatile memory 304 (e.g., a hard drive) is larger and slower than the system memory. Nonetheless, a request for data continues down the memory hierarchy 300 until the data is found. When the data is found, it is then loaded into the highest available level of memory (i.e., L-1 cache 306). Populating the L-1 cache 306 or the L-2 or lower caches (308, 310) with needed data is known as "warming up" the cache.

Figure 4:
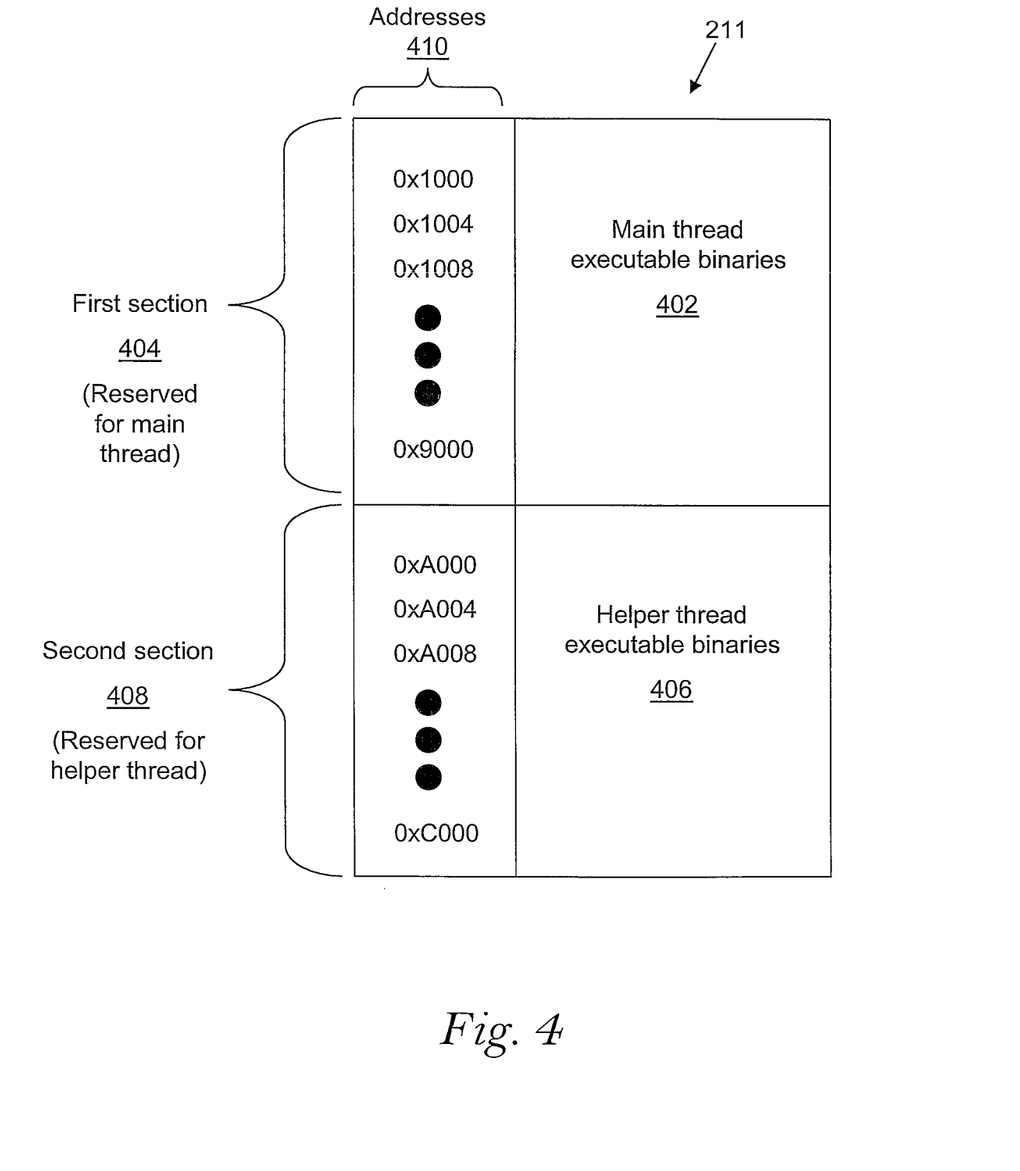
FIG. 4 depicts a set of helper thread binaries that have been cloned from a set of main thread binaries.

With reference now to FIG. 4, additional detail of the application's code space 211 is presented. As discussed above, the application's executable binaries are created when the operating system uses a linker to convert object code into executable binaries. In accordance with the present invention, the operating system or linker converts the object code into two sets of binaries: main thread executable binaries and helper thread executable binaries. The main thread executable binaries make up a complete set of executable instructions for the application's object code. The helper thread executable binaries are either an exact copy of the main thread executable binaries, or else are an altered set of the main thread executable binaries. In one embodiment, the altered set of main thread executable binaries (i.e., the set of helper thread executable binaries) contains only instructions for fetching data (e.g., from a table, a storage location, etc.) and does not contain any computational instructions. In one embodiment, the application's code space 211 is reserved into two sections. The first section 404 is reserved for the complete set of main thread executable binaries 402 and corresponding addresses 410, while the second section 408 is reserved for the helper thread executable binaries 406 and corresponding addresses

410. Note that, in one embodiment, the first section 404 and the second section 408 do not overlap, which results in a simpler implementation. Note also that the two sections may be reserved for the exclusive use of either the main thread or the helper thread. In one embodiment, the second section 408 is shorter than the first section 404. The different lengths of the respective sections may be arbitrarily preset (based on historical experience regarding how much shorter the altered helper thread is compared to the main thread), or the different lengths may be dynamically assigned according to how many operations have been removed from the main thread to create the helper thread.

Figure 5:
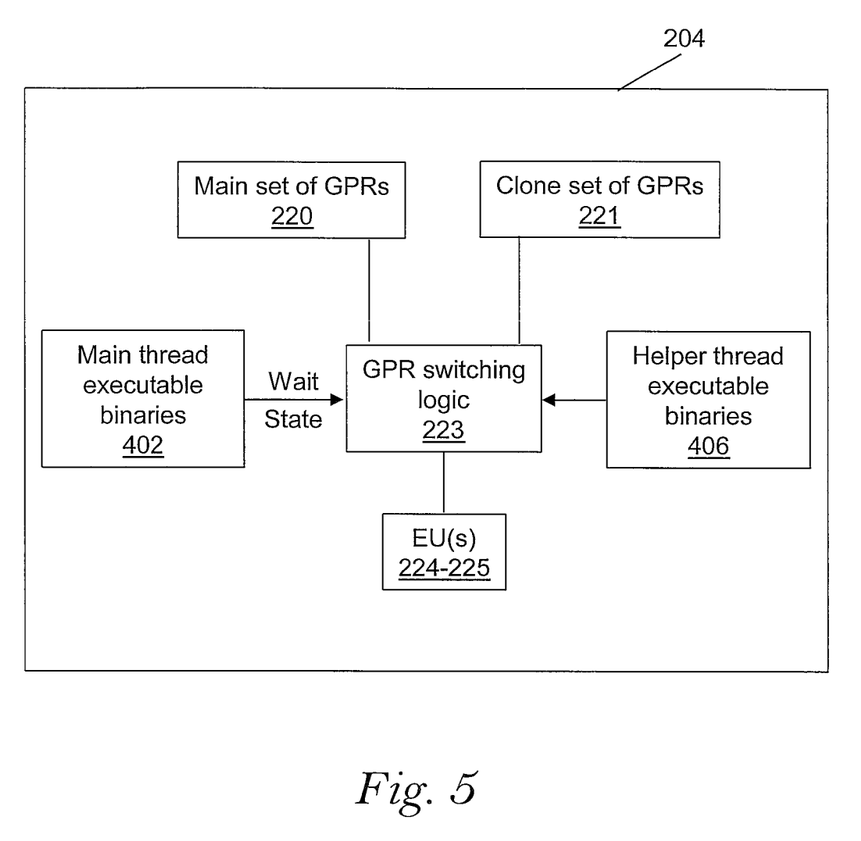
FIG. 5 illustrates an exemplary processor core having duplicate General Purpose Registers (GPRs) coupled to Execution Units (EUs) in the processor core.

Referring now to FIG. 5, an abbreviated detail of some of the elements of the processor core 204 (shown in FIG. 2) is presented. As depicted, the execution units (EUs) 224-225 are coupled to the main (primary) set of GPRs 220 and the clone set of GPRs 221 by a GPR switching logic 223. GPR switching logic 223 includes logic that detects a wait state in the set of main thread executable binaries 402 (discussed above in FIG. 4). When such a wait state occurs, the GPR switching logic 223 stops the use of the main set of GPRs 220, checks that the values of the clone set of GPRs 221 match those of the regular GPRs 220, and starts using the clone set of GPRs 221, such that execution of the next operation in the helper thread executable binaries 406 does not pollute the main set of GPRs 220. Nonetheless, execution of the helper thread executable binaries 406 still allows the Level One D-cache to be warmed up with data that will be needed by the main thread executable binaries 402 as soon as the wait state is over.

Note that as use of the different sets of GPRs (220 and 221) occurs (when execution of the main thread switches enters a wait state, allowing the helper thread to commandeer "No Operation—NOOP" time), the L-1 I-Caches 306 shown in FIG. 3 must have closure, by swapping out soft and hard architected states and contexts and/or performing required reservation operations.

Figure 6:
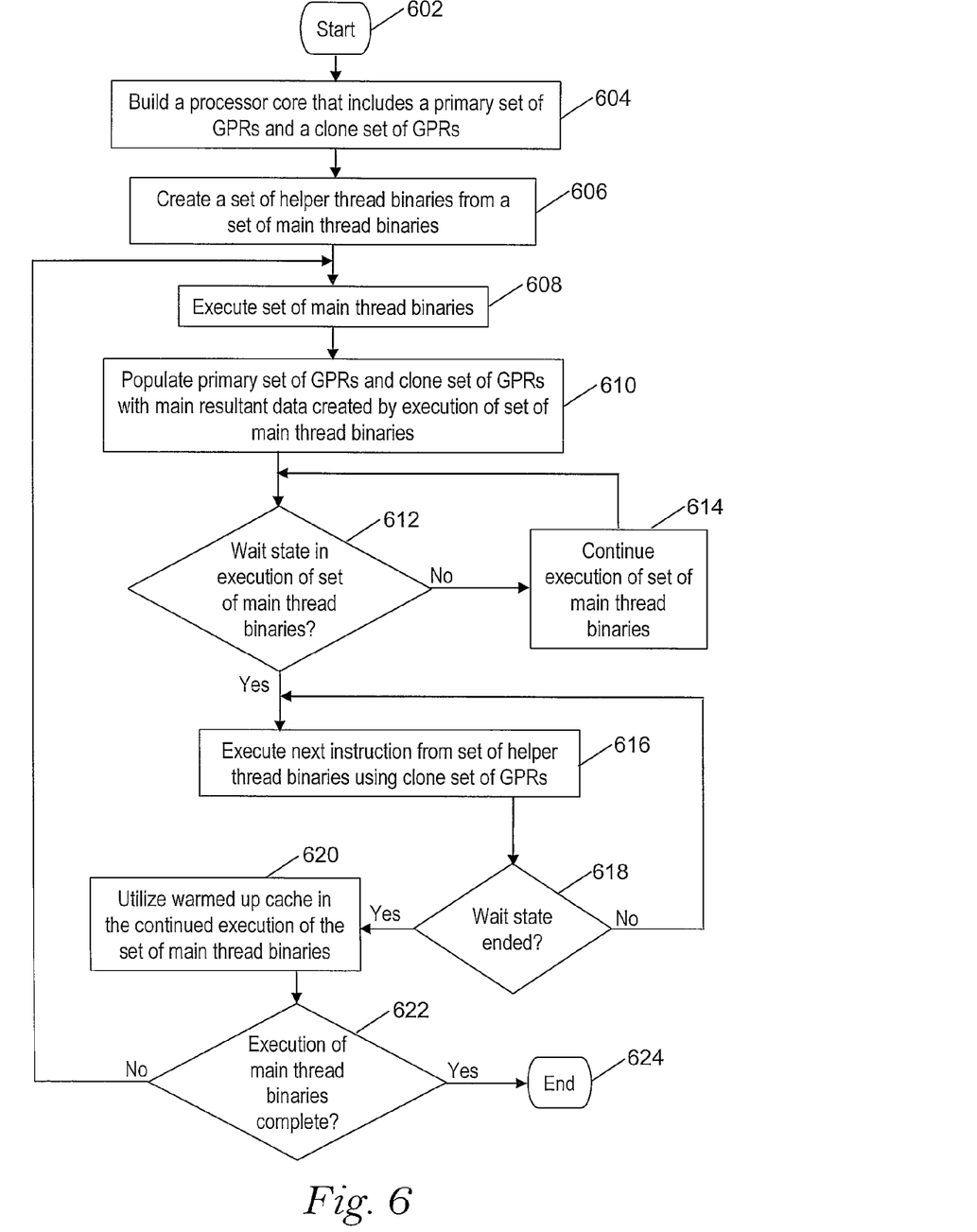
FIG. 6 is a high-level logical flowchart of an exemplary set of steps performed to utilize cloned GPR sets to pre-fetch data needed by the set of main thread binaries.

With reference now to FIG. 6, a high-level flow-chart of steps taken to utilize a helper thread in a clone GPR is presented. After initiator block 602, a processor core is outfitted with both a primary (main) set of General Purpose Registers (GPRs) as well as a clone set of GPRs (block 604). In one embodiment, the clone set of GPRs is another set of hardware GPRs that are the same size (e.g., same number of registers) or a different size (more or fewer registers) than the main set of GPRs. In another embodiment, the main and clone set of GPRs are "carved out" of an original main set of GPRs by software logic that allocates some of the registers to the main set of GPRs and other registers to the clone set of GPRs.

As described in block 606, a set of helper thread binaries is created by an operating system from a set of main thread binaries (block 604). This step can be performed by simply making a clone copy of the set of main thread binaries (after they have been compiled from source code and linked from object code). The set of main thread binaries then begins executing (block 608). As the set of main thread binaries is executing, both the primary set of GPRs and the clone set of GPRs are populated with data that is developed/created/calculated/retrieved by the execution of the set of main thread binaries (block 610). In another embodiment, as the set of main thread binaries executes, results are only copied to the primary set of GPRs 220, and values of this set of GPRs are copied to the clone GPRs 221 once the helper thread is indicated to proceed.

As described in query block 612, as long as the set of main thread binaries does not enter a wait state (e.g., pauses while retrieving remote data, while waiting for a called subroutine to complete execution, etc.), then the set of main thread binaries continues to execute normally (block 614). However, if the set of main thread binaries does enter a wait state, then the set of helper thread binaries starts executing at the next (preferably non-computational) instruction using the clone set of GPRs (block 616). That is, a pointer "knows" which operation in the set of main thread binaries last started execution when the wait state occurred. Rather that re-execute this instruction in the helper thread (and thus causing the helper thread to also go into a wait state), the next instruction thereafter is executed by the set of helper thread bin aries, this allowing the set of helper thread binaries to "warm up" cache memory with data that will be needed by the set of main thread binaries when the wait state is over. Thus, when the wait state for the set of main thread binaries is over (query block 618), then the set of main thread binaries against starts executing, but now with the advantage of having local cache warmed up with data that has been fetched by the helper thread (block 620). The process continues in an iterative manner (query block 622) until the set of main thread binaries completes execution, and the process ends (terminator block 624). Note that when the process ends, the helper thread binaries are deleted, and thus "die" (are not in any queue for execution) at that time.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A method of retrieving data for use when executing a process thread, the method comprising:

populating a processor core having General Purpose Register (GPR) switching logic embodied therein with a main set of General Purpose Registers (GPRs) and a clone set of GPRs, wherein the GPR switching logic provides a point of connection between the main set of GPRs, the clone set of GPRs, and one or more execution units (EUs);

creating a set of helper thread binaries from a set of main thread binaries;

executing the set of main thread binaries using the main set of GPRs;

the GPR switching logic detecting the main thread binaries entering in to a wait state;

in response to the set of main thread binaries entering the wait state, the GPR switching logic:

stopping the executing of the main set of GPRs;

checking a plurality of values of the clone set of GPRs for a match to a plurality of values of the main set of GPRs; and in response to detecting the match, executing a next operation in the set of helper thread binaries, wherein the next operation follows an operation that caused the wait state in the set of main thread binaries, wherein the set of helper thread binaries do not modify the content of memory, the main set of GPRs, and input/output (I/O) registers, and wherein the set of helper thread binaries only utilizes the clone set of GPRs via the GPR switching logic;

populating a local cache with data generated by executing the set of helper thread binaries; and in response to the set of main thread binaries exiting from the wait state, utilizing the data within the local cache when continuing execution of the set of main thread binaries.

2. The method of claim 1, further comprising:
populating the clone set of GPRs with a same data that populates the main set of GPRs during execution of the set of main thread binaries.

3. The method of claim 1, wherein the creating the set of helper thread binaries from the set of main thread binaries further comprises:
cloning the main thread binaries to the set of helper thread binaries;
wherein the set of clone thread binaries is an exact copy of the set of main thread binaries, with processor logic that prevents the clone thread binaries from modifying the content of memory or the I/O registers.

4. The method of claim 1, wherein the set of clone thread binaries is an abbreviated version of the set of main thread binaries, modified so the set of clone thread binaries will not modify the content of memory or the I/O registers.

5. The method of claim 4, wherein the abbreviated version comprises only instructions that are designed to retrieve stored data.

6. The method of claim 1, further comprising:
the GPR switching logic determining an effectiveness of the set of helper thread binaries by:
executing the set of main thread binaries using the set of helper thread binaries;
executing the set of main thread binaries without using the set of helper thread binaries;
measuring a first length of time required to execute the set of main thread binaries using the set of helper thread binaries; and
measuring a second length of time required to execute the set of main thread binaries without using the set of helper thread binaries.

7. The method of claim 6, further comprising:
determining if executing the set of main thread binaries using the set of helper thread binaries takes longer than executing the set of main thread binaries without using the set of helper thread binaries;
in response to determining that executing the set of main thread binaries using the set of helper thread binaries takes longer than executing the set of main thread binaries without using the set of helper thread binaries, prohibiting a future use of helper thread binaries when executing the main thread binaries.

8. The method of claim 1, wherein the main set of GPRs and the clone set of GPRs are separate pieces of hardware.

9. The method of claim 1, wherein the main set of GPRs and the clone set of GPRs are virtual GPRs created by logically partitioning a same hardware set of GPRs.

10. A system comprising:
a processor;
a data bus coupled to the processor;
a memory coupled to the data bus; and
a computer-usable medium embodying computer program code, the computer program code comprising instructions executable by the processor and configured for retrieving data for use when executing a process thread by:
populating a processor core having General Purpose Register (GPR) switching logic embodied therein with a main set of General Purpose Registers (GPRs) and a clone set of GPRs, wherein the GPR switching logic provides a point of connection between the main set of GPRs, the clone set of GPRs, and one or more execution units (EUs);
creating a set of helper thread binaries from a set of main thread binaries;
executing the set of main thread binaries using the main set of GPRs;
the GPR switching logic detecting the main thread binaries entering in to a wait state;
in response to the set of main thread binaries entering a wait state, the GPR switching logic:
stopping the executing of the main set of GPRs;
checking a plurality of values of the clone set of GPRs for a match to a plurality of values of the main set of GPRs; and
in response to detecting the match, executing a next operation in the set of helper thread binaries, wherein the next operation follows an operation that caused the wait state in the set of main thread binaries, wherein the set of helper thread binaries do not modify the content of memory, the main set of GPRs, and input/output (I/O) registers, and wherein the set of helper thread binaries only utilizes the clone set of GPRs via the GPR switching logic;
populating a local cache with data generated by executing the set of helper thread binaries; and
in response to the set of main thread binaries exiting from the wait state, utilizing the data within the local cache when continuing execution of the set of main thread binaries.

11. The system of claim 10, wherein the instructions are further configured for:
populating the clone set of GPRs with a same data that populates the main set of GPRs during execution of the set of main thread binaries.

12. The system of claim 10, wherein the creating the set of helper thread binaries from the set of main thread binaries further comprises:
cloning the main thread binaries to the set of helper thread binaries;
wherein the set of clone thread binaries is an exact copy of the set of main thread binaries that are prevented from modifying the content of memory or the I/O registers.

13. The system of claim 10, wherein the set of clone thread binaries is an abbreviated version of the set of main thread binaries.

14. The system of claim 13, wherein the abbreviated version has only instructions that are designed to retrieve stored data.

15. The system of claim 10, wherein the instructions are further configured for:
the GPR switching logic determining an effectiveness of the set of helper thread binaries by:

executing the set of main thread binaries using the set of helper thread binaries;

executing the set of main thread binaries without using the set of helper thread binaries;

measuring a first length of time required to execute the set of main thread binaries using the set of helper thread binaries; and measuring a second length of time required to execute the set of main thread binaries without using the set of helper thread binaries.

16. The system of claim 10, wherein the instructions are further configured for:

determining if executing the set of main thread binaries using the set of helper thread binaries takes longer than executing the set of main thread binaries without using the set of helper thread binaries;

in response to determining that executing the set of main thread binaries using the set of helper thread binaries takes longer than executing the set of main thread binaries without using the set of helper thread binaries, prohibiting future use of helper thread binaries when executing the main thread binaries.

17. The system of claim 10, wherein the main set of GPRs and the clone set of GPRs are separate pieces of hardware.

18. The system of claim 10, wherein the main set of GPRs and the clone set of GPRs are virtual GPRs created by logically partitioning a same hardware set of GPRs.

19. A computer-readable storage medium having a plurality of instructions processable by a machine, wherein said plurality of instructions, when processed by said machine, causes said machine to retrieve data for use when executing a process thread, by performing a plurality of functions comprising:

populating a processor core having General Purpose Register (GPR) switching logic embodied therein with a main set of General Purpose Registers (GPRs) and a clone set of GPRs wherein the GPR switching logic provides a point of connection between the main set of GPRs, the clone set of GPRs, and one or more execution units (EUs);

wherein the main set of GPRs and the clone set of GPRs are one of: (a) separate pieces of hardware; and (b) virtual GPRs created by logically partitioning a same hardware set of GPRs;

creating a set of helper thread binaries from a set of main thread binaries;

wherein the set of helper thread binaries is one of: (a) an exact copy of the set of main thread binaries created by cloning the main thread binaries to the set of helper thread binaries, having processor logic that prevents the clone thread binaries from modifying the content of memory, the main set of GPRs, or input/output (I/O) registers; and (b) an abbreviated version of the set of main thread binaries, modified so the set of helper thread binaries will not modify the content of memory or the I/O registers, and the abbreviated version comprises only instructions that are designed to retrieve stored data;

executing the set of main thread binaries using the main set of GPRs;

populating the clone set of GPRs with a same data that populates the main set of GPRs during execution of the set of main thread binaries;

the GPR switching logic detecting the main thread binaries entering in to a wait state;

in response to the set of main thread binaries entering a wait state, the GPR switching logic:

stopping the executing of the main set of GPRs;

checking a plurality of values of the clone set of GPRs for a match to a plurality of values of the main set of GPRs; and in response to detecting the match, executing a next operation in the set of helper thread binaries, wherein the next operation follows an operation that caused the wait state in the set of main thread binaries, wherein the set of helper thread binaries do not modify the content of memory, the main set of GPRs, and input/output (I/O) registers, and wherein the set of helper thread binaries only utilizes the clone set of GPRs;

populating a local cache with data generated by executing the set of helper thread binaries; and in response to the set of main thread binaries exiting from the wait state, utilizing the data within the local cache when continuing execution of the set of main thread binaries.

20. The computer-readable medium of claim 19, wherein the plurality of instructions further causes said machine to perform the functions of:

the GPR switching logic determining an effectiveness of the set of helper thread binaries by:

executing the set of main thread binaries using the set of helper thread binaries;

executing the set of main thread binaries without using the set of helper thread binaries; and measuring a first length of time required to execute the set of main thread binaries using the set of helper thread binaries; and measuring a second length of time required to execute the set of main thread binaries without using the set of helper thread binaries;

determining if executing the set of main thread binaries using the set of helper thread binaries takes longer than executing the set of main thread binaries without using the set of helper thread binaries; and in response to determining that executing the set of main thread binaries using the set of helper thread binaries takes longer than executing the set of main thread binaries without using the set of helper thread binaries, prohibiting a future use of helper thread binaries when executing the main thread binaries.

* * * * *